United States Patent

[11] 3,622,232

[72] Inventor Charles R. Munnerlyn
 Fairport, N.Y.
[21] Appl. No. 52,578
[22] Filed July 6, 1970
[45] Patented Nov. 23, 1971
[73] Assignee Tropel, Inc.
 Fairport, N.Y.

[54] BEAM DIRECTOR
 11 Claims, 13 Drawing Figs.
[52] U.S. Cl. .................................................. 350/301
[51] Int. Cl. ................................................... G02b 5/08
[50] Field of Search ....................................... 350/6, 7,
 285, 288, 299, 301–303; 248/469, 474–480,
 485–487; 356/138, 172, 145, 146, 153; 74/89. 15

[56] References Cited
 UNITED STATES PATENTS
3,499,713 3/1970 Ito ................................. 356/138
3,564,451 2/1971 Shimazu et al. ................ 331/94.5
2,849,911 9/1958 Brunson ......................... 356/138

*Primary Examiner*—David Schonberg
*Assistant Examiner*—Michael J. Tokar
*Attorney*—Cumpston, Shaw & Stephens ABSTRACT: A beam director has a base with a mirror arranged to reflect the beam upward, and a guide above the base carries a vertically adjustable support arm. A rooftop reflector is arranged on the support arm above the base mirror so that the beam reflected from the base mirror is incident on the rooftop reflector. The horizontal position of the rooftop reflector along a line perpendicular to the ridge line of the reflector is adjustable to translate the beam horizontally without changing its direction angle. Preferably, the rooftop reflector is also rotatable about horizontal and vertical axes for changing the beam direction angle.

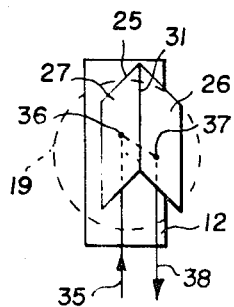
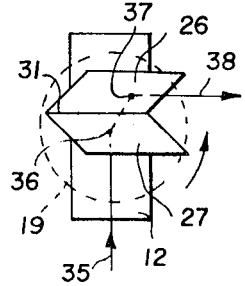
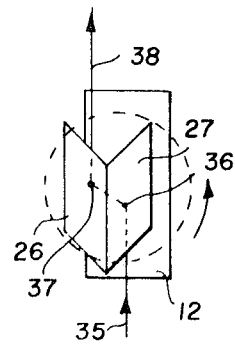
FIG. 6　　　　FIG. 6A　　　　FIG. 6B
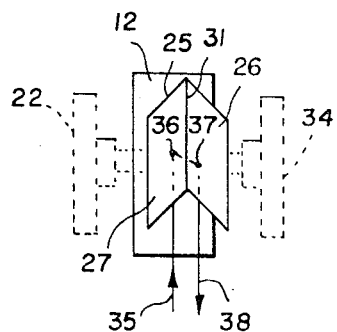
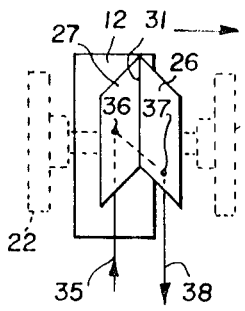
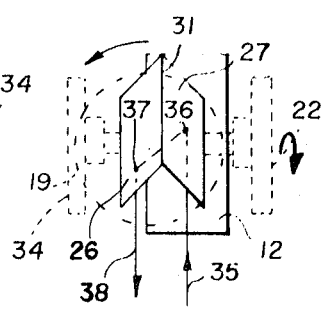
FIG. 7　　　　FIG. 7A　　　　FIG. 7B
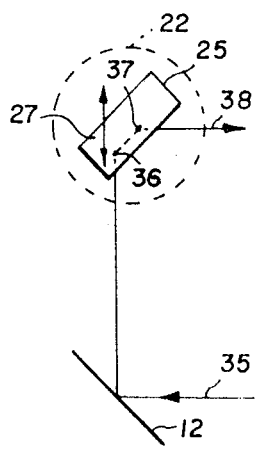
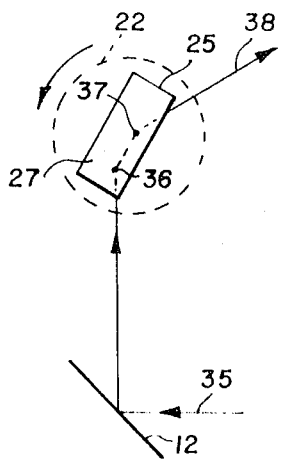
FIG. 8　　　　FIG. 8A
INVENTOR.
CHARLES R. MUNNERLYN
BY Cumpston, Shaw
and Stephens
ATTORNEYS

BEAM DIRECTOR

THE INVENTIVE IMPROVEMENT

Lasers are being used more widely, and there is an increasing need for directing and positioning laser beams accurately relative to other equipment. The invention involves the recognition of these needs and a recognition of all the different angular and translational adjustments that are desirable in positioning laser beams relative to other equipment. The invention also includes a compact and convenient beam director capable of meeting all these needs in a simple, rugged, economical, and reliable device.

SUMMARY OF THE INVENTION

The inventive beam director includes a base having a reflector arranged to reflect a beam upward, a guide arranged above the base, a support arm carried on the guide, and means for vertically adjusting the position of the support arm on the guide. The support arm carries a rooftop reflector arranged above the base reflector so that the upwardly reflected beam is incident on the rooftop reflector. The rooftop reflector is horizontally adjustable along a line perpendicular to the ridge line of the rooftop reflector to translate the beam horizontally without changing its direction angle. The vertical adjustment of the support arm and the horizontal adjustment of the rooftop reflector accomplish vertical and horizontal translation of the beam, and the rooftop reflector is also preferably rotatable around vertical and horizontal axes to adjust vertical and horizontal beam direction angles.

DRAWINGS

FIGS. 6–8a are schematic views of movements of the inventive beam director to accomplish translational and angular adjustments of the beam.

DETAILED DESCRIPTION

Figure 1:
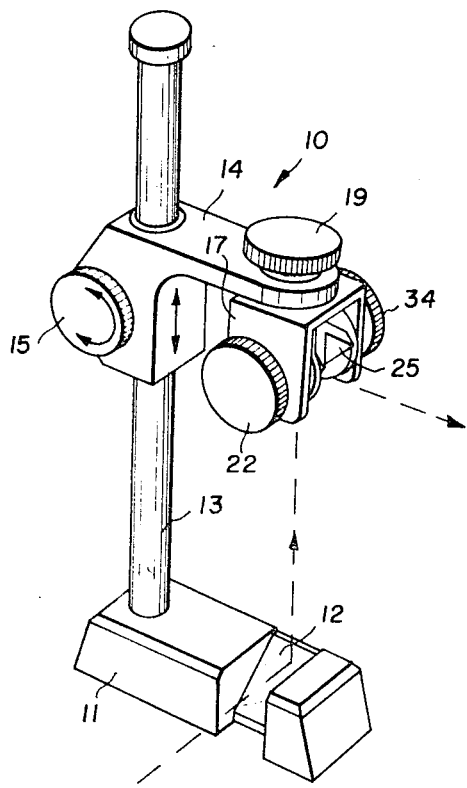
FIG. 1 is an isometric view of a preferred embodiment of the inventive beam director.
Figure 2:
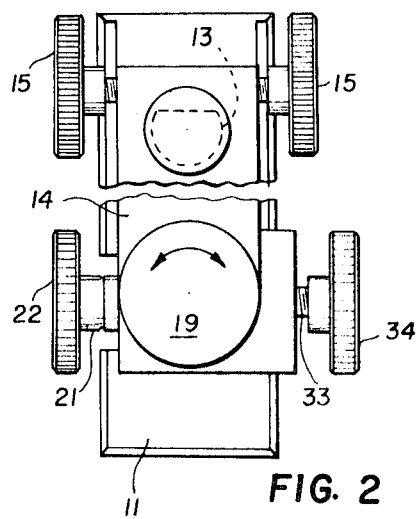
FIG. 2 is a plan view of the beam director of FIG. 1.
Figure 4:
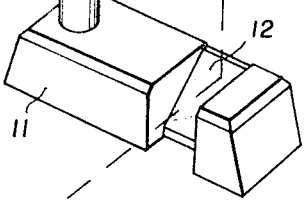
FIG. 4 is an elevational view of an alternative rooftop reflector for the inventive beam director.
Figure 3:
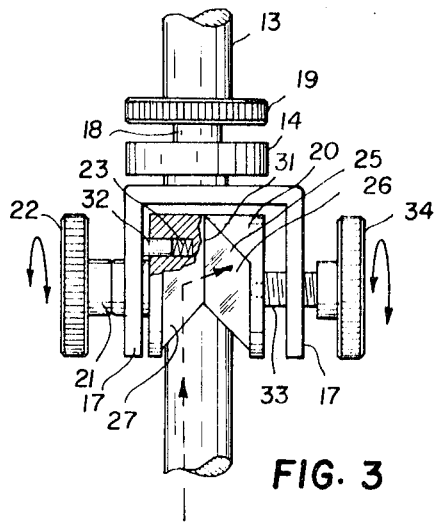
FIG. 3 is a partially cutaway, front elevational view of a fragment of the beam director of FIG. 1.

A preferred embodiment of the inventive beam director as illustrated in the drawings, has a base 11 supporting the device and carrying a mirror 12 that is preferably set at 45° to the vertical and the horizontal to reflect a horizontally incident beam vertically upward, as illustrated. A rooftop reflector 25 is arranged above mirror 12 and is movable as described below to accomplish vertical and horizontal translation of the directed beam, as well as both vertical and horizontal direction angle changes. Rooftop reflector 25 is generally positioned above mirror 12 so that the beam reflected vertically from mirror 12 is incident on rooftop reflector 25. Rooftop reflector 25 can be a pair of mirrors 26 and 27 set perpendicular to each other as best shown in FIGS. 1 and 3, or a rooftop prism 28 such as shown in FIG. 4 having surfaces 29 and 30 that are perpendicular to each other. The upwardly reflected beam is incident on one of the mirrors 26 or 27 or one of the prism surfaces 29 or 30 on one side of ridge line 31, and is reflected to the opposite mirror or surface to be reflected outward from the device. The adjustment of rooftop reflector 25 according to the invention to direct the beam as required is described below.

A column 13 that is preferably D-shaped in cross section is mounted to extend vertically from base 11. A support arm 14 is mounted to move vertically on column 13 which serves as a vertical guide for support arm 14. Rotatable knobs 15 on support arm 14 turn a friction roller 16 which engages the flat side of column 13 to move support arm 14 up and down. This adjusts the vertical position of arm 14 above base 11 and accomplishes translation of the directed beam on the vertical axis.

A U-shaped bracket 17 is carried on a shaft 18 extending vertically through support arm 14, and a knob 19 turns bracket 17 on the vertical axis for changing the horizontal direction angle of the directed beam. Bracket 17 is mounted eccentrically on shaft 18 so that a 180° rotation of knob 19 moves bracket 17 horizontally relative to base mirror 12.

A holder 20 supports rooftop reflector 25 in the space inside bracket 17. Holder 20 is carried on a shaft 21 that is turned by knob 22 and is axially slidable in bracket 17. As knob 22 is turned, holder 20 is rotated on a horizontal axis for adjusting the vertical direction angle of rooftop reflector 25.

Holder 20 and its supporting shaft 21 and knob 22 are biased to the right, as illustrated in FIG. 3, by compression spring 23 that is trapped in recess 25 in holder 20 to press free pin 32 against an inside wall of bracket 17. Such right-hand bias of holder 20 is limited by the axial position of screw 33 threaded into the opposite leg of bracket 17 and turned by knob 34. Turning knob 34 to position screw 33 axially moves rooftop reflector 25 horizontally along a line perpendicular to the ridge line 31 of rooftop reflector 25 to translate the directed beam horizontally.

The axial translation of the directed beam by horizontal movement of holder 20 between the legs of bracket 17 is limited by the space between such bracket legs. Also, the axis of shaft 18 is centered over base mirror 12, and the eccentricity of bracket 17 relative to shaft 18 is such that the ridge line 31 of rooftop reflector 25 is off the center of base mirror 12, and horizontal translation by adjustment of screw 33 enlarges or reduces such eccentricity. However, horizontal translation of the directed beam on the other side of the center of base mirror 12 is possible by rotating knob 19 180° to turn bracket 17 180° to alter its eccentricity relative to base mirror 12.

Figure 5:
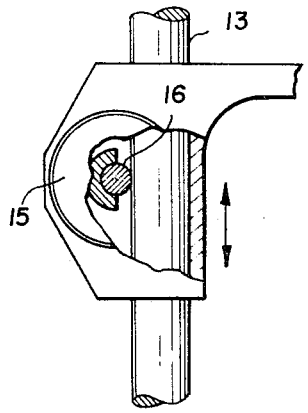
FIG. 5 is a partially cutaway, elevational view of a fragment of the beam director of FIG. 1.

The various movements and adjustments or rooftop reflector 25 for directing a beam according to the invention are schematically illustrated in FIGS. 6–8a. The means for accomplishing the adjustments, and some of the motions involved in the adjustments are also illustrated in FIGS. 1–5. For example, FIGS. 1 and 5 show vertical adjustment of support arm 14 for vertical translation of the directed beam, and FIGS. 1 and 3 show how a horizontal beam incident on mirror 12 is reflected vertically onto reflector 27 of rooftop mirror 25, is then reflected under ridge line 31 to reflector 26 from which it is directed horizontally outward (directly toward the viewer in FIG. 3).

In the schematic illustrations of FIGS. 6–8a the directed beam is horizontally incident on the centerline of base mirror 12, and reflection points for the beam are indicated by dots in the drawings.

Adjustment of horizontal beam direction angle is shown in FIGS. 6, 6a and 6b. Horizontal beam 35 is incident on mirror 12 and is directed vertically to be incident on mirror 27 at reflection point 36. Mirror 27 directs the beam under ridge line 31 to reflection point 37 on mirror 26 from which beam 38 is directed horizontally outward. As knob 19 is turned to the position illustrated in FIG. 6a, the incoming beam 35 follows the same reflection pattern through points 36 and 37 and is directed outward as beam 38 at a different horizontal angle. As rotation of knob 19 is continued to the position illustrated in FIG. 6b, incoming beam 35 is still reflected through points 36 and 37 on mirrors 27 and 26, and is directed outward as beam 38 horizontally angled 180° from the starting position of FIG. 6. Since knob 19, shaft 18, and bracket 17 are rotatable through 360° or more, output beam 38 can be swept around a complete circle of horizontal adjustment angles.

Adjustment of the directed beam in the vertical plane is best shown in FIGS. 8 and 8a. Incoming beam 35 is incident on base mirror 12 and reflected upward to mirror 27 of rooftop reflector 25 which is set at 45° to the vertical to direct beam 38 horizontally outward as shown in FIG. 8. Vertical translation of output beam 38 is accomplished by vertical movement of support arm 14 on column 13 through knobs 15 and friction drive roller 16 as previously described. To change the vertical direction angle of output beam 38, knob 22 is rotated to turn shaft 21 carrying holder 20 which rotates rooftop reflector 25 as illustrated in FIG. 8a. Since knob 22 and rooftop reflector 25 are rotatable 360° or more about the horizontal axis, output beam 38 can be given a wide range of vertical direction angles at any horizontal direction angle.

Horizontal translation of the directed beam is best shown in FIGS. 7, 7a and 7b. The circumstances of FIGS. 7 are similar to those in FIG. 6 with incoming beam 35 incident on mirror 12 and reflected from point 36 on mirror 27 to point 37 on mirror 26 which directs output beam 38 horizontally outward. Ridge line 31 is close to the axis of shaft 18 and the centerline of mirror 12, and from such position, horizontal translation by screw 33 and knob 34 is possible toward the right to the position shown in FIG. 7a. Such horizontal motion is accomplished by turning knob 34 to move screw 33 to the right to move rooftop reflector 25 to the right and increase its right-hand eccentricity from the centerline of mirror 12 and the axis of vertical supporting shaft 18. In such position, incoming beam 35 follows a similar reflection path from mirrors 12, to 27, to 26; but reflection points 36 and 37 move apart relative to ridge line 31, and the reflected beam passes between mirrors 27 and 26 further from ridge line 31 so that output beam 38 is translated relatively to the right as illustrated.

If translation of output beam 38 to the left is desired, then knob 19 and bracket 17 are rotated 180° in a turn similar to the one made between FIG. 6 and FIG. 6b, and knob 22 is turned 90° to produce the effect illustrated in FIG. 7b. Incoming beam 35 is then directed vertically upward by mirror 12 to be incident on rooftop mirror 27 at the same reflection point 36. Then the beam is directed under ridge line 31 to the left against mirror 26 at reflection point 37 from which output beam is directed horizontally outward. From such position, knob 34 can be turned to adjust screw 33 to move rooftop reflector 25 to horizontally through an adjustment range to the left of the center of base mirror 12.

Thus, output beam 38 can be translated through a full range from the left of base mirror 12 to the right of base mirror 12 by adjusting eccentric bracket 17 and screw 33. Also, the entire beam director 10 is physically movable so that incoming beam 35 need not be incident on the center of base mirror 25, and further adjustment can be obtained by moving director 10.

Those skilled in the art will appreciate that many different mounts, moving means, and reflectors can be used within the spirit of the invention. Once the basic beam director with its rooftop reflector and desired adjustments are known, those skilled in the art will appreciate that other vertical adjusting means, vertical and horizontal rotating means, and horizontal translation means for the rooftop reflector are possible.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention.

I claim:
1. A beam director comprising:
   a. a base;
   b. means arranged on said base for reflecting a beam upward;
   c. guide means arranged above said base;
   d. a support arm arranged on said guide means;
   e. means for vertically adjusting the position of said support arm on said guide means;
   f. a rooftop reflector arranged on said support arm above said base reflector so that said upwardly reflected beam is incident on said rooftop reflector; and
   g. means for horizontally adjusting the position of said rooftop reflector along a line perpendicular to the ridge line of said rooftop reflector to translate said beam horizontally without changing its direction angle.

2. The beam director of claim 1 including means for rotating said rooftop reflector on a vertical axis to change the horizontal direction angle of said beam.

3. The beam director of claim 1 including means for rotating said rooftop reflector on a horizontal axis to change the vertical direction angle of said beam.

4. The beam director of claim 1 wherein said rooftop reflector comprises a pair of mirrors set perpendicular to each other.

5. The beam director of claim 1 wherein said rooftop reflector comprises a prism having surfaces perpendicular to each other.

6. The beam director of claim 1 wherein said horizontal adjusting means comprises a bracket carrying said rooftop reflector and means for moving said rooftop reflector horizontally relative to said bracket.

7. The beam director of claim 6 including s screw arranged to adjust the horizontal position of said rooftop reflector relative to said bracket.

8. The beam director of claim 6 including a vertical rotatable shaft carrying said bracket, and said rooftop reflector being generally eccentric relative to said shaft.

9. The beam director of claim 8 including a screw arranged to adjust the horizontal position of said rooftop reflector relative to said bracket.

10. The beam director of claim 8 including a horizontal rotatable shaft mounted on said bracket to carry said rooftop reflector for rotation about a horizontal axis.

11. The beam director of claim 10 including a screw arranged to adjust the horizontal position of said rooftop reflector relative to said bracket.

* * * * *